Aug. 25, 1931.  W. SPITZ  1,820,843
PLANT STAND
Filed Oct. 6, 1928
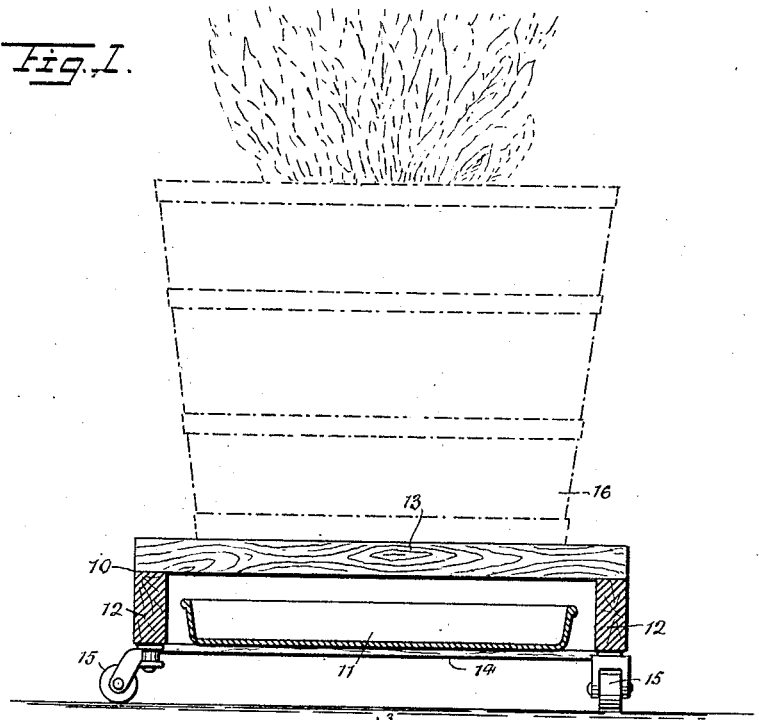
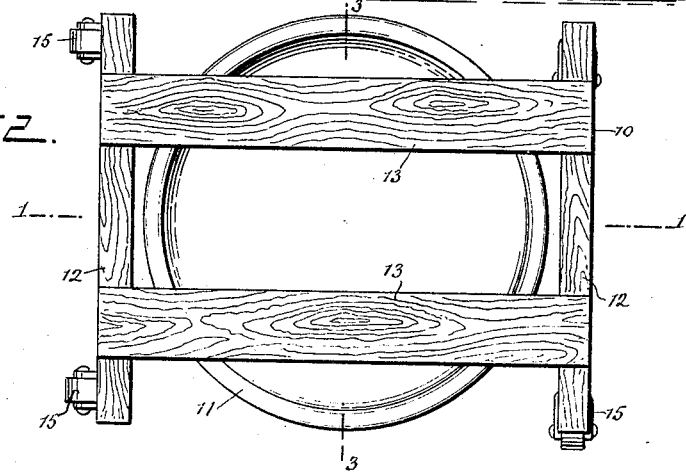
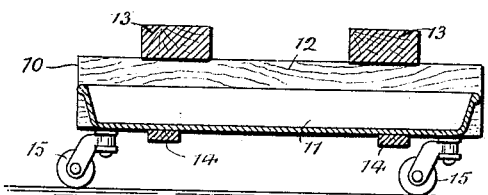
WITNESSES
H. J. Walker
Chris Feinle
INVENTOR
William Spitz
BY Munn & Co.
ATTORNEY Patented Aug. 25, 1931

1,820,843

UNITED STATES PATENT OFFICE

WILLIAM SPITZ, OF BROOKLYN, NEW YORK

PLANT STAND

Application filed October 6, 1928. Serial No. 310,813.

This invention relates to a stand designed and adapted to be used for holding or supporting flowers or plants in tubs or pots.

Some of the objects of the invention are: to provide a stand of the indicated character which will be extremely simple of construction, neat in appearance, durable in use, and inexpensive of manufacture; one which will be portable so as to obviate lifting and carrying of the flowers or plants when it is desired to change the location thereof; one which is easy to move about; one which makes it easy and convenient to water the flowers or plants; one which provides for ventilation of the soil; one which is provided with means for receiving surplus water when watering the flowers or plants; and one which facilitates the removal of the surplus water or drainage.

The nature of the invention and its distinguishing features and advantages will appear when the following specification is read in connection with the accompanying drawings, in which—

Figure 1 is a sectional view through the stand, the section being taken on the line 1—1 of Fig. 2, and showing a plan together with a tub or pot in dot and dash lines.

Fig. 2 is a plan view.

Fig. 3 is a sectional view taken on the line 3—3 of Fig. 2.

Referring now more particularly to the several views of the drawings, it will be apparent that the invention resides in the combination of a portable stand or base, and a separate drip pan 11. The stand or base 10 may be made of any preferred materials, and for the sake of cheapness may be made from wood consisting of end members 12, upper and lower members 13 and 14 respectively which are relatively spaced and which are secured respectively at their opposite ends to said end members 12. Casters 15 are positioned respectively at the opposite ends of each of the end members 12 for the purpose of rendering the base 10 readily portable. From the foregoing it will be readily apparent that a common flower or plant tub or pot having the usual drainage opening in the bottom thereof may be readily placed on the upper members 13 of the base 10, as illustrated in Fig. 1, such tub or pot being designated 16. Inasmuch as some potted flowers or plants are quite heavy, the provision of the casters 15 makes it possible to readily wheel or move the base together with the potted flower or plant to any desired location without damage to floors or carpets, and obviates the necessity of lifting these heavy potted flowers or plants.

The drip pan 11 is provided for the purpose of catching or receiving surplus water or drainage which results when watering the flowers or plants, and said drip pan 11 is laterally insertable in place on the lower members 14 of the base 10, and may also be readily removed therefrom when it is desired to empty the drip pan 11.

From the foregoing it will also be apparent that the particular construction of the base 10 provides for necessary ventilation and moisture around the roots of the flowers or plants; that it may be made rugged and durable in construction as well as neat in appearance; and that it may be manufactured with comparative economy.

It is to be understood that both the base 10 and drip pan 11 will be finished or dressed with suitable paint or lacquer, and if desired the base and drip pan may be decorated with any suitable floral designs without materially adding to the cost due to the extreme simplicity and size of the stand.

I claim:

A stand of the class described comprising the combination of a portable base and a separate drip pan, said base comprising end members, upper and lower relatively spaced members secured to said end members, and rollers on certain of said members, said upper members of the base being adapted to have positioned thereon a filled plant or flower pot, and said drip pan being laterally insertable in place on the lower members of the base beneath said pot and removable from said lower members.

Signed at New York in the county of New York and State of New York this 5th day of October, A. D. 1928.

WILLIAM SPITZ.